May 15, 1934.  L. ANDERSON  1,958,905

SUSPENSION FOR VEHICLES

Filed May 5, 1931

Inventor
Leonard Anderson
By Attorney
Shrev, Crowe + Gordon

Patented May 15, 1934

1,958,905

UNITED STATES PATENT OFFICE 1,958,905

SUSPENSION FOR VEHICLES

Leonard Anderson, Avon, N. J.

Application May 5, 1931, Serial No. 535,275

5 Claims. (Cl. 280—124)

Generically this invention relates to suspension for vehicles, but it is more especially directed to the type for effecting flexibility of wheel action with respect to the chassis or frame structure, and constitutes an improvement on my application, Serial No. 274,098, filed April 30, 1928.

An important object of this invention is the provision of heavy duty springs mounted intermediate the wheel and frame structures, permitting the widest possible range of flexibility and wheel action with respect to the frame, and means associated therewith for limiting such action in spring compressing direction.

Another important object of this invention is the provision of a plurality of wheels on each side of the vehicle frame, each wheel being mounted on a movable arm and a super spring device mounted intermediate each arm and supporting frame, whereby the widest possible range of flexibility is afforded each wheel with respect to the supporting frame independently of the others, and means associated with the spring for limiting such action in one direction and additional shock absorbing means for limiting such movement in the opposite direction.

A further object of this invention is the provision of a plurality of wheels on each side of a supporting frame, each wheel mounted on a stub axle carried by a rocker arm journaled in the vehicle frame, a super spring structure hingedly connected to said arm intermediate its fulcrum and stub axle, the upper end of said structure being connected to the vehicle frame by a semi-universal joint, means associated with said joint for controlling the tension of said spring, and shock absorbing means for limiting the flexibility of the wheel action in spring compressing direction, said shock absorbing means being attached to the frame in such a manner as to effect equal distribution of load stresses at its points of attachment and over a large area of the frame.

Another object of this invention is the provision of a spring suspension and shock absorbing mechanism associated with airplane wheels, whereby the shock incident to landing is substantially absorbed and travel over an uneven ground surface rendered substantially smooth by reason of the independent flexibility of the wheels with respect to the supporting structure.

Figure 1:
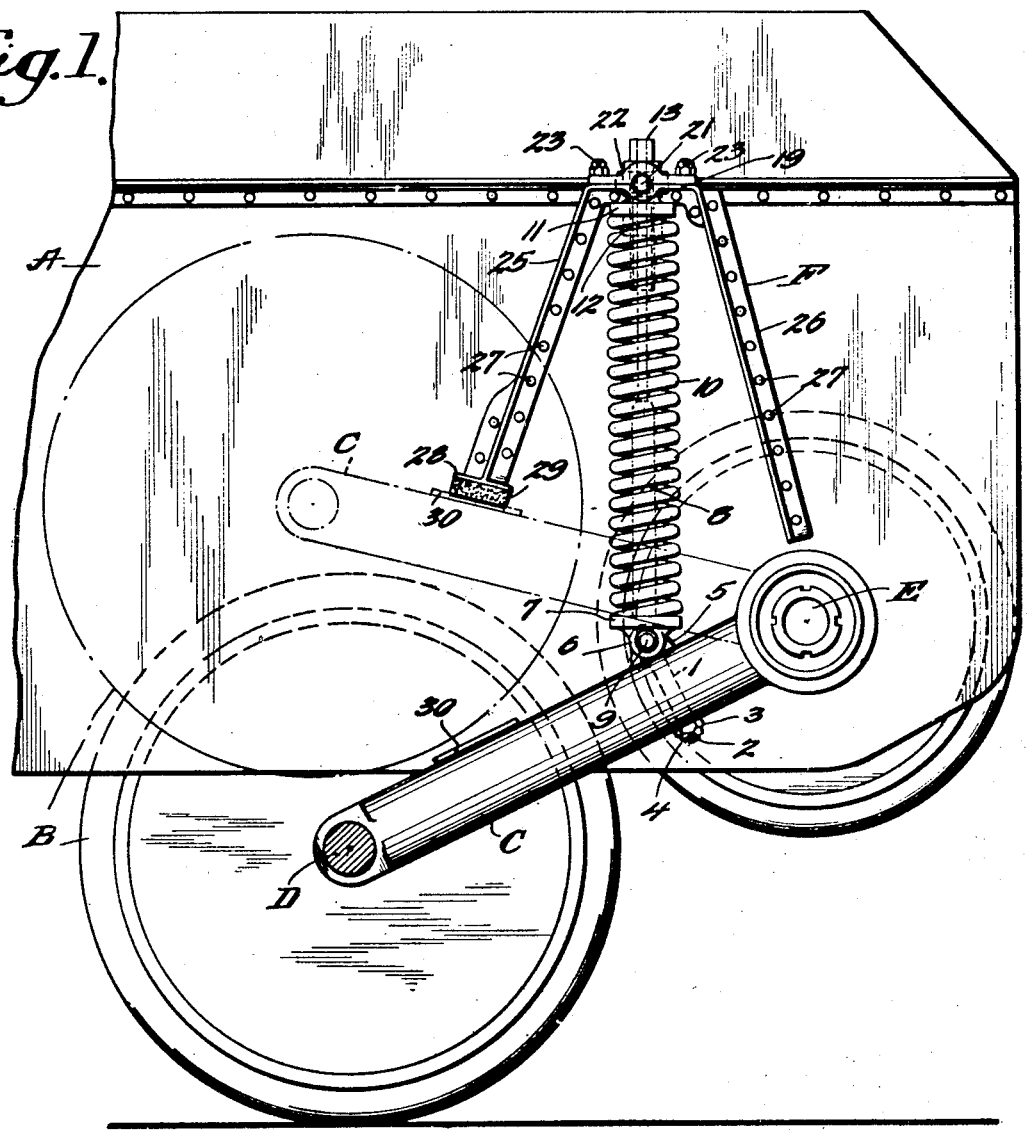
Figure 2:
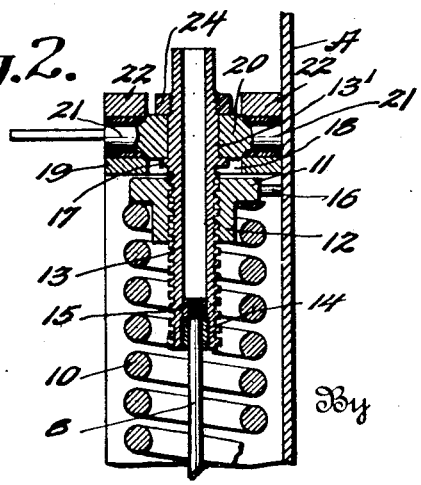

With these and other objects in view, which will become apparent as the description proceeds, the invention resides in the construction, combination and arrangement of parts, hereinafter more fully described and claimed, and illustrated in the accompanying drawing, in which like characters of reference indicate like parts throughout the several figures, of which:

Fig. 1 is a fragmentary side elevation of a vehicle frame showing my improved suspension and shock absorbing structure, and Fig. 2 is a fragmentary vertical section through the heavy duty springs and its adjusting mechanism.

In the illustrated embodiment characterizing this invention there is shown a vehicle frame A, and associated structure comprising wheel B, rocker arm C, stub axle D and main axle E, such structure being more particularly referred to in my co-pending application above mentioned.

The rocker arm C is perforated as at 1 intermediate its fulcrum and stub shaft D to receive the anchor or hinge bolt 2 firmly secured to said arm by nut 3 and lock cotter pin 4 extending through the free end of said bolt, the upper end of said bolt terminating in a flattened perforated head 4 adapted to be received between the spaced depending perforated lips 6 of the flange spring seat 7 formed on the lower end of plunger 8 and hingedly connected thereto by pintle bolt 9.

Mounted on plunger 8 is compression spring 10, the lower end of which is adapted to seat on flange seat 7, the upper spring seat 11 formed with hub portion 12 has threadedly mounted therein the revolvable hollow screw member 13, and threaded in the lower end of said member is nut 14, through which extends the plunger 8, the upper end of said plunger terminating in piston nut 15 threaded thereon and adapted to seat on nut 14 to prevent disengagement of plunger 8 from member 13 in downward direction, but permitting its free upward movement in spring compressing direction, as will hereinafter more fully appear.

The spring seat 11 is prevented from rotation by pin 16 contacting the frame A when member 13 is actuated to effect adjustment of the spring 10, as will be clear without further description. The member 13 at a point spaced from its upper end is formed with a lateral flange 17 adapted to be housed within opening 18 in section 19 of anchor frame F and adapted to seat against the under surface of block 20 through which extends the enlarged portion 13' of member 13, said block terminating on opposite sides in trunnions 21 journaled between section 19 and complemental cap plate 22 secured by bolts 23, whereby a semi-universal connection between member 13 and frame F is effected. Nut 24 threadedly mounted on the upper end of member 13 and adapted to seat on the upper surface of block 20 firmly secures member 13 thereto, for a purpose hereinafter more fully appearing.

Anchor frame F comprises horizontal section 19 terminating at either end in a downwardly and outwardly extending leg portions 25 and 26, respectively, said member being secured to frame A by a plurality of rivets or other suitable fastening elements 27, as will be apparent without further description. The lower end of leg 25 terminates in a T-shaped member 28 to the under surface of which is suitably secured rubber, leather, felt or other suitable cushioning and shock absorbing material 29 adapted to engage seat 30 suitably secured to rocker arm C to absorb the shock and limit the upward movement of said rocker arm in spring compressing direction, either when the wheel B comes into sudden contact with the ground surface or encounters projections or depressions in said surface as will be clear without further description.

While the operation of the device is clear from the above description it might be well to further state that in order to regulate the tension of spring 10 it is but necessary to rotate member 13 by means of a suitable wrench applied to the free end, which causes spring seat 11 to travel throughout the length of said member 13, thereby tensioning said spring as desired. The range of flexibility of the wheel is clearly shown in Fig. 1 and as the rocker arm is elevated spring 10 is compressed, plunger 8 being free to move upward within member 13 and when the rocker arm contacts the shock absorbing medium 29 of Frame F, which latter is so formed that the points of connection of the plunger mechanism with the rocker arm and semi-universal joint at point of connection with the main frame A is always within frame F, thereby distributing the load stresses over a wide area of the supporting frame, such construction including the type of universal connection employed is adapted to efficiently function under extreme load and difficult road surface conditions.

From the above it is apparent that I have designed a shock absorbing spring suspension mechanism adapted to effect flexibility of wheel action with respect to the vehicle supporting structure and each wheel having independent means for limiting the range of wheel action in spring expanding direction and additional means for limiting said action in spring compressing direction, the last mentioned means additionally constituting a shock absorbing element and adapted to effect equal distribution of the load stresses over a maximum area of the supporting structure and on opposite sides of said spring means to withstand such heavy load stresses incident to rough surface conditions as above described.

From the foregoing description it will be seen that I have designed a spring suspension and shock absorbing mechanism of great durability, simple in construction, easily installable, manufacturable at a reasonable cost and efficient for the purposes intended.

Although in practice I have found that the form of my invention illustrated in the accompanying drawing and referred to in the above description as the preferred embodiment, is the most efficient and practical; yet realizing that conditions will necessarily vary, I desire to emphasize that various minor changes in details of construction, proportion and arrangement of parts, may be restorted to within the scope of the appended claims without departing from or sacrificing any of the principles of this invention.

Having thus described my invention, and without enumerating variations and equivalents, what I desire protected by Letters Patent is as set forth in the following claims:

1. In a vehicle of the heavy duty type embodying a plurality of road wheels, each adapted to independently respond to irregularities of the terrain over which they travel, of means for permitting vertical movement of the respective wheels in accordance with the said irregularities, said means including a supporting frame, a surface contacting wheel, a rocker-arm for effecting pivotal connection between said wheel and an axle, an anchor means carried by the frame, a plunger mechanism including a spring interconnecting the anchor means and rocker-arm, stop means associated with the anchor for engagement with said rocker-arm at a point spaced from said plunger mechanism for limiting the movement of the surface contacting member in spring compressing direction, whereby the stresses incident to the limiting movement of said rocker-arm are transmitted from said anchor member directly to said frame over a wide area thereof and independently of said plunger mechanism.

2. In a vehicle of the heavy duty type embodying a plurality of road wheels, each adapted to independently respond to irregularities of the terrain over which they travel, of means for permitting vertical movement of the respective wheels in accordance with the said irregularities, said means including a supporting frame, a wheel carrying rocker-arm pivotally connected to the frame, an anchor means carried by the frame, a plunger mechanism comprising a cylinder element semi-universally connected with the anchor means, a stem member coacting with said cylinder pivotally connected to said rocker-arm, a spring mounted on said plunger mechanism, said cylinder being operable to tension said spring, said anchor means constituting a shock absorbing medium and stop element adapted to engage said rocker-arm at a point offset from said plunger mechanism for limiting the movement of said wheel in spring compressing direction, whereby the stresses incident to the limiting movement of the wheel are distributed from the rocker-arm through said anchor over a wide area of the frame and independently of said spring and plunger mechanism.

3. In a vehicle of the heavy duty type embodying a plurality of road wheels, each adapted to independently respond to irregularities of the terrain over which they travel, of means for permitting vertical movement of the respective wheels in accordance with the said irregularities, said mechanism comprising a supporting frame, a wheel carrying rocker-arm pivotally carried by the frame, a plunger mechanism including a plunger element having one end pivotally connected to said rocker-arm, a semi-universal joint member connected to said anchor, a cylinder element with one end journaled in said semi-universal joint member and the other coacting with said plunger, a spring mounted on said plunger and cylinder element, said cylinder element being rotatable with respect to said plunger and semi-universal member to tension said spring, said anchor constituting a shock absorbing and stop means adapted to engage said rocker-arm at a point spaced from said plunger mechanism for limiting the movement of said wheel and rocker-arm in spring compressing direction, whereby the stresses incident thereto are imparted through said anchor to said frame and over a wide area thereof independently of said spring and plunger mechanism.

4. In a vehicle of the heavy duty type embodying a plurality of road wheels, each adapted to independently respond to irregularities of the terrain over which they travel, of means for permitting vertical movement of the respective wheels in accordance with the said irregularities, said means including a supporting frame, a wheel carrying rocker-arm pivotally associated with the frame, an anchor means connected to the frame, a compression spring mechanism joining said anchor and rocker-arm, said anchor terminating in a shock absorbing and stop element adapted to contact the rocker-arm at a point spaced from said spring for limiting the movement of said rocker-arm and wheel in spring compressing direction, whereby the stresses incident to the contact engagement of said arm with said stop are distributed from said arm through said anchor directly to said frame and over a wide area thereof independently of said spring mechanism.

5. In a vehicle of the heavy duty type embodying a plurality of road wheels, each adapted to independently respond to irregularities of the terrain over which they travel, of means for permitting vertical movement of the respective wheels in accordance with said irregularities, said means including a supporting frame, a wheel carrying rocker-arm associated with the frame, anchor means carried by the frame, a plunger mechanism uniting said anchor and rocker-arm and including a spring seat pivotally connected to the rocker-arm, means including a semi-universal joint connecting the other end of said mechanism to said anchor, said means including a supporting member rotatably mounted in said anchor member, a cylindrical member extending through said supporting member and rotatable with respect thereto, a spring seat threadedly mounted on said cylinder, a spring mounted on said plunger engageable with said seats, whereby rotation of said cylinder effects tensioning of said spring, said anchor member additionally constituting a stop and shock absorbing medium engageable with said arm at a point offset from said plunger and spring for limiting the movement of said rocker-arm in spring compressing direction, the relation of said anchor means with respect to the frame being such as to absorb and distribute over a wide area the stresses resulting from the compression of said spring and limiting the movement of said arm.

LEONARD ANDERSON.